US006999526B2

(12) United States Patent
Gerlach

(10) Patent No.: US 6,999,526 B2
(45) Date of Patent: Feb. 14, 2006

(54) METHOD FOR SIMPLE SIGNAL, TONE AND PHASE CHANGE DETECTION

(75) Inventor: Christian Georg Gerlach, Ditzingen (DE)

(73) Assignee: Alcatel, Paris (FR)

( * ) Notice: Subject to any disclaimer, the term of this patent is extended or adjusted under 35 U.S.C. 154(b) by 628 days.

(21) Appl. No.: 09/750,058

(22) Filed: Dec. 29, 2000

(65) Prior Publication Data

US 2001/0007442 A1 Jul. 12, 2001

(30) Foreign Application Priority Data

Jan. 3, 2000 (DE) ................................ 100 00 008

(51) Int. Cl.
*H04L 27/14* (2006.01)
*H04L 27/06* (2006.01)
(52) U.S. Cl. ........................ 375/324; 375/316; 375/325
(58) Field of Classification Search ................ 375/316, 375/324, 325, 222, 344, 329, 340, 362, 374, 375/349; 348/731; 331/16
See application file for complete search history.

(56) References Cited

U.S. PATENT DOCUMENTS

| 4,620,069 | A | * | 10/1986 | Godwin et al. | .......... 379/22.02 |
| 5,150,384 | A | * | 9/1992 | Cahill | .................. 375/375 |
| 5,537,438 | A | * | 7/1996 | Mourot et al. | .............. 375/231 |
| 5,729,577 | A | * | 3/1998 | Chen | ...................... 375/334 |
| 5,809,133 | A | * | 9/1998 | Bartkowiak et al. | ........ 379/386 |
| 5,852,638 | A | * | 12/1998 | Chen et al. | .................. 375/344 |
| 6,021,165 | A | * | 2/2000 | Ohkubo et al. | .............. 375/344 |
| 6,031,418 | A | * | 2/2000 | Fowler | ........................ 329/341 |
| 6,111,919 | A | * | 8/2000 | Yonge, III | ................... 375/260 |
| 6,556,674 | B1 | * | 4/2003 | Li et al. | ...................... 379/386 |
| 6,560,331 | B1 | * | 5/2003 | Cooklev et al. | ............ 379/283 |
| 6,608,896 | B1 | * | 8/2003 | Felder et al. | ................ 379/386 |
| 6,731,745 | B1 | * | 5/2004 | Goto | ........................... 379/283 |

FOREIGN PATENT DOCUMENTS

EP 565 372 B1 3/1998

OTHER PUBLICATIONS

"A Simple Phase-reversal tone disabler", by J. L. Melsa and R.J. Ragland in the conference proceedings of the ICASSP 86 Conference, Tokyo, Japan, pp. 2619-2622.
"Discrete-Time Signal Processing", by Alan V. Oppenheim and Ronald W. Schafer, Prentice Hall Signal Processing Series, 1989, pp. 585-587.

* cited by examiner

*Primary Examiner*—Chieh M. Fan
*Assistant Examiner*—Jason M. Perilla
(74) *Attorney, Agent, or Firm*—Sughrue Mion, PLLC

(57) ABSTRACT

A method for detecting an information signal, tone and/or a phase change of a tone in one or more signals which contain inter alia this information signal or this tone, is characterised in that each signal is divided into segments (blocks), in that only a selection of the blocks are further processed for detection, whereas the blocks which have not been selected are not processed further, wherein the signal in the blocks is made available for further processing in the form of samples of a signal in the time domain, in that the blocks are subjected to a transformation, for example a transformation from the time domain to the frequency domain, in order to produce at least one output value, and in that a decision regarding detection is made with the aid of at least one output value of the transformation.

14 Claims, 3 Drawing Sheets

METHOD FOR SIMPLE SIGNAL, TONE AND PHASE CHANGE DETECTION

BACKGROUND OF THE INVENTION

The Invention relates to a method for detecting an information signal, tone and/or a phase change of a tone in one or more signals which contain inter alia this information signal or this tone.

Inband signalling with special signals, primarily sinusoidal tones, is used in many areas of telecommunication, for example in switching systems. A specific frequency must be reliably detected from a mixture of sinusoidal frequencies which are superimposed by noise or other signals and it must optionally also be detected whether the sinusoidal oscillation contains a phase change or not.

It is known to detect a tone by band filters or by analysing the signal in the frequency range by computing the discrete Fourier transforms of the signal or a signal block. The principle of the known algorithms for detecting a phase change consists in comparing the instantaneous values of the incoming tone with a version which has been time delayed by an exact multiple of the period length, as is known from EP 0 565 672 B1 or from the article "A simple phase-reversal tone disabler" by J. L. Melsa and R. J. Ragland in the conference proceedings from the ICASSP 86 Conference, Tokyo, pages 2619 to 2622. Owing to frequency tolerances and strong noise interference, a critical point for the algorithm lies in the estimation of the correct period length. The number of computation operations required is very high, so the known algorithms are not suitable owing to the high expenditure on hardware in computing units or digital signal processes (DSP), in order to process, for example, 2,000 channels in parallel for the purpose of detecting tones and/or phase changes.

SUMMARY IF THE INVENTION

The object of the invention is to provide a method which can be carried out with relatively low expenditure and which is therefore suitable for monitoring a large number of channels (for example 2,000 channels) with regard to the occurrence of specific tones and optionally phase change with high reliability at relatively low cost.

This object is achieved in accordance with the invention in a method for detecting an information signal, tone and/or phase change of a tone in one or more signals which contain inter alia this information signal or this tone, wherein the signal in which specific information signals or tones (frequencies) are to be detected is divided into time-consecutive blocks and only a selection of the blocks, which is smaller than the total number of blocks, is examined, and a transformation, for example a frequency transformation (transformation from time domain to the Laplace domain), of the signal is carried out in the examined blocks in order to obtain result values for the decision. In one embodiment, these may then be combined.

The invention is not restricted to tone and phase change detection but will be described below primarily with regard thereto.

It is advantageous in the invention that owing to the division into individual blocks and processing of only a selection of these blocks it is possible to reduce the complexity while increasing the detection delay, in particular if there are no strict requirements on the detection speed. Owing to the sub-sampling at block output level with potential subsequent connection, it is possible to exchange computing power for delay time or to improve the distribution of computing power. Certain standards stipulate for example that signal tones must have been detected at the latest approximately 0.4 seconds before they start. The examined blocks of the message signal of a single channel must therefore follow each other so closely in time that the just mentioned regulation can be adhered to for example.

Therefore, complexity can be exchanged for detection delay with the invention depending on requirements.

The case can arise where despite the evaluation of only a selection of the blocks, each individual block per se can supply the information regarding the presence or absence of the specifically sought frequency sufficiently reliably (i.e. also taking into account the signal-to-noise ratio for example). In other cases on the other hand, a decision would not be possible based on the information which a single block supplies or it would be afflicted by an unacceptably large probability of error.

In such cases, it is provided in accordance with an embodiment of the invention that result values of a plurality of selected blocks are combined by a function or mapping, and the result is evaluated in order to obtain a reliable decision value "z".

Depending on the requirement, mapping can, for example, be linear, can in particular include multiplications and additions, but it can also be non-linear however, for example operate with threshold values or boundary values. If with three consecutive blocks it is required, for example, that none of the signals supplied by each individual block may have the value "0" in order that a positive decision can be made, this can be achieved very easily by means of a multiplication as mapping function. The three-fold position above a threshold value can be achieved for example with a comparison function and an AND gate as mapping function.

In an embodiment of the invention mapping is selected such that it takes complex values into account. It is advantageous in this case that phase relationships can simply be taken into account or can also be recognised.

Although the solution could also be employed for continuous signals, the preferred embodiment of the invention relates to sampled (time-discrete) signals.

In principle it is also possible to detect not only sinusoidal signals but also for example rectangular signals or any signalling signals or code sequences with the method according to the invention. The transformation used must be adapted accordingly.

The block length must on the one hand be so large that sufficient accuracy of signal detection is ensured, on the other hand it must not be too large such that the processing time (computing time) is allowed to increase unnecessarily. In the embodiments described later it is assumed that with a maximum frequency of 4 kHz during telephone speech transmission a sampling frequency of 8 kHz is used for the purpose of obtaining digitised signals, and that generally 80 successive sampling values are used as block length. The block length in terms of time in the above-mentioned example is therefore 0.01 seconds (block length N=80 means that 80 successive sampling values of the signal are used for the computation).

Sampling of an analogue signal can be carried out specifically for the purposes of the invention or a sampled signal which is already present is used for the invention.

The invention is explained for the most part using a block length of 80 sampling values and a block interval of 80 sampling values. If an individual block still cannot supply the information required for an unequivocal decision the information is then available, for example, at the earliest after the occurrence of the second processed block, i.e. after a time which corresponds overall to three times 80 sample pulse intervals. In a further embodiment of the invention the block length is reduced in size, halved to 40 in the embodiment, so only a block containing 40 sample values is not evaluated between two blocks which are to be evaluated. In this case, the decision can be made after a period of time comprising three times 40 sample pulse intervals.

The frequency transformation can advantageously be a (in particular discrete) Fourier transform or one of its special cases (DFT or FFT). Other transformations can also be used for the invention, however, which allow clear conversion from the time range into a frequency range.

A frequency-selective transformation is advantageously used to search for specific tones, i.e. for specific sinusoidal frequencies, which transformation is adjusted to the tone sought in each case.

An embodiment of the invention is preferred in which the digital Fourier transform is carried out by a Goertzel algorithm. The Goertzel algorithm is described in A. V. Oppenheim and R. W. Schafer "Discrete-time signal processing", Englewood Cliffs, N.J.: Prenticehall, Inc., 1989, page 585 ff. At the time the Goertzel algorithm was the most effective known method for computing a DFT value (DFT=discrete Fourier transform) of a sequence with finite duration of length N during a sample period T. The DFT frequencies in this case are the frequencies $f_0=k/NT$ where $k=0, 1, \ldots, N-1$.

The invention recognises that the Goertzel algorithm can be used for the purpose of proving the existence of the tones in a signal for any frequencies and can be adjusted to any frequencies. In accordance with an embodiment of the invention the Goertzel algorithm is adjusted to the instantaneously sought frequency. The advantage resides in the great speed of the algorithm with low complexity of computation.

The phase information of the complex output signal of the frequency transformation is advantageously utilised to determine phase changes, preferably in the method which uses the Goertzel algorithm, the phase information of the signal produced by the Goertzel algorithm.

Further advantages of the invention reside in the fact that it can be carried out easily. A sharp reduction in the computation complexity by a factor of at least 2 and an increase in reliability compared with the state of the art is achieved.

A plurality of message channels can be examined with a single device for carrying out the method, wherein the above-mentioned device expediently examines one respective block from each of the channels successively in time and after examining the block of the last channel examined in this way starts at the first channel again and therefore examines the second block of the first channel, this block having a more or less large time interval from the first examined block of the first channel. In this way a single device can examine a plurality of message channels, for example two, for the occurrence of signal tones, for example with a single signal processor.

In embodiments of the invention a variation is made as a function of the noise level in such a way that the reliability of detection remains the same even with a markedly increasing noise level and even in the event of a prolonged processing duration in that in a first embodiment the block length is increased with increasing noise level and in a second embodiment the number of blocks which are processed until a decision is made is increased.

The possible applications for the method according to the invention lie, for example, in signalling for echo suppressors and echo compensators in switching devices which are to be turned off in certain cases. In accordance with a known regulation, a tone of 2100 Hz without phase change as turn-off tone is used for signalling for echo suppressors. The same frequency is used for turning off echo compensators but with phase change. Further frequencies which can be detected with the method according to the invention are in particular the dialling tones used in tone selection.

BRIEF DESCRIPTION OF THE DRAWINGS

The invention will now be described, and further features and advantages of the invention emerge from the following description of embodiments of the invention with the aid of the drawings, which show details which are essential to the invention, and from the claims. The individual features can be embodied individually per se or in combination in an embodiment of the invention. In the drawings:

DETAILED DESCRIPTION OF THE INVENTION

The detection of sinusoidal tones in noise is a general task of signal processing. Sinusoidal tones are very often used for data services in telephone networks, in particular for signalling in the speech band. This is done, for example, in the dual tone-multifrequency-DTMF signalling system as is used for the dialling process, in signalling for switching systems or signalling system No. 5 etc., ITU Q. 141, and in particular in signalling for echo suppressors and echo compensators as specified in G. 164, G. 165.

Sinusoidal waves of specific frequencies for example must be detected whilst other frequencies must be ignored. In the example described in detail below, phase changes in the sinusoidal waves are additionally used for signalling purposes.

Figure 1:
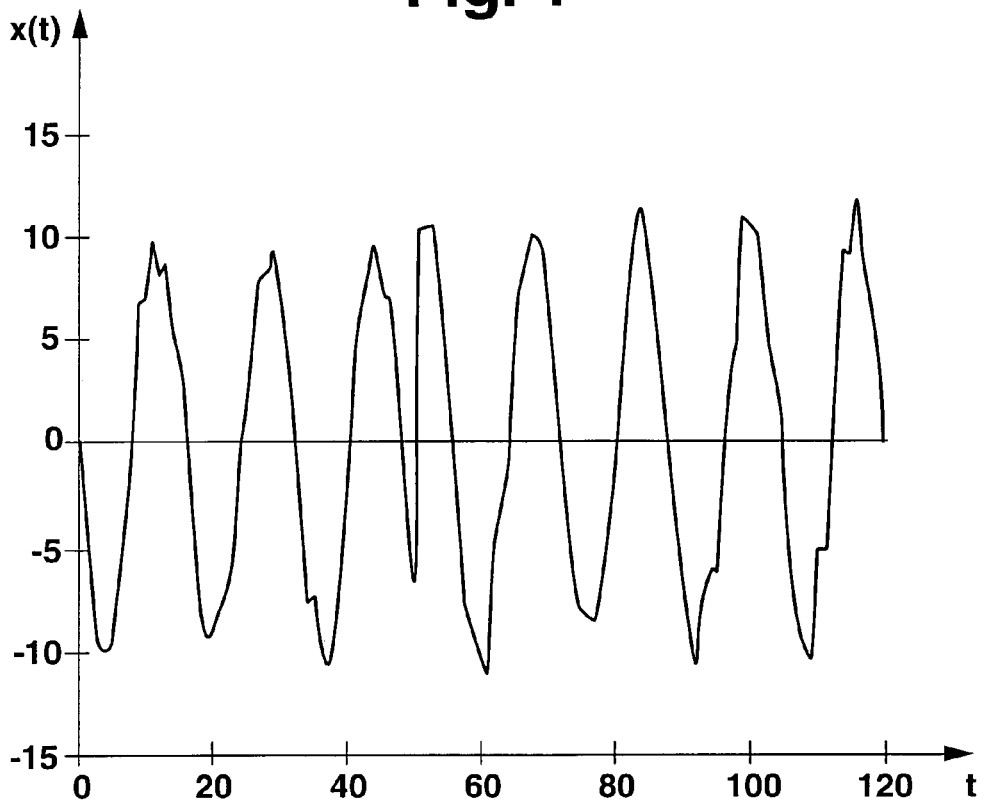
FIG. 1 shows a sampled channel signal in which a phase change can be detected.

An example of a signal of an individual channel to be detected is shown in FIG. 1. The time axis shows samples, i.e. ⅛ milliseconds. The signal shown has a frequency of 500 Hz with tolerance deviations. It has a phase shift with a value of 180° ($=\pi$).

Figure 2:
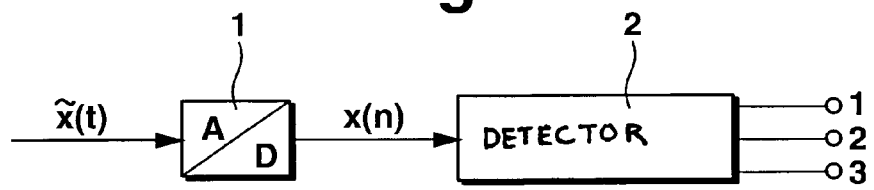
FIG. 2 is a schematic view of a detector arrangement.

In the block diagram in FIG. 2 the signal of an individual communication signal is represented by $\tilde{x}(t)$. Although the invention can be implemented in analogue form, in the preferred embodiment it is implemented in digital form. Therefore the (in FIG. 2 analogue) low-pass signal (4 kHz in the example) is sampled in a suitable manner with the sample time T and converted by an AD converter 1 into digital form. This gives x(n)=x̃ (nT) which is further processed. The signal shown by way of example in FIG. 1 can be represented by $$x(n)=r(n)+A\cdot\cos(2\pi fTn+\theta(n)).$$

In this case the amplitude A can be zero or equal to $A_0$ and the phase term $\theta$ (n) can be constant or equal to $\pi$ u(n-$N_c$), where u(n) can assume the values 0 or 1 and represents the unit shift function. The noise present in x(n) is denoted by the signal r(n).

The detector 2 (FIG. 2) must now decide between three possible results:
1. There is no tone (A=0);
2. There is a simple tone of specified frequency;
3. There is a tone of specified frequency which has a phase step of $\pi$ (phase reversal, as shown in FIG. 1).

Figure 3:
FIG. 3 is the view of the position of blocks with a block length N=80 of a single channel evaluated by the method in accordance with an embodiment.
Figure 4:
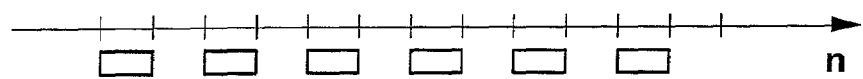
FIG. 4 is the view of the position of blocks with a block length 40 of a single channel evaluated by the method according to a further embodiment.

The detector 2 does not evaluate all blocks of a channel but only a selection of them, in the example every second block with a block length of 80, as shown in FIG. 3. In a further example described below the blocks have a block length of 40, as shown in FIG. 4.

In principle the number of omitted blocks need not be constant but can also vary. Furthermore, the block interval does not have to correspond to the block length but can assume any other value and can also vary.

Figure 5:
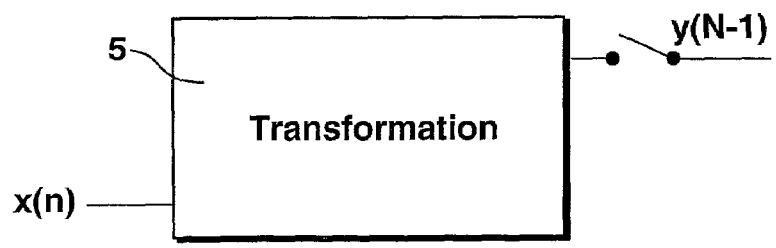
FIG. 5 is a schematic view of the conversion of samples of a block by means of a transformation to produce an output value for an evaluated block of length N.

It is described with the aid of FIG. 5 that the function or the processing step of transformation 5 pertains to the detector so it can carry out its task. The transformation effects a conversion of the sample signals of a block into the frequency range. Only after processing of the entire block does the transformation emit one or more output values, which is symbolised top right in FIG. 5 by a sampler.

In a preferred embodiment the function of the transformation is carried out by making computations according to the Goertzel algorithm. The Goertzel algorithm can be used for the invention for any frequency $f_0$ and is illustrated in FIG. 6 as it is used for the invention.

Figure 6:
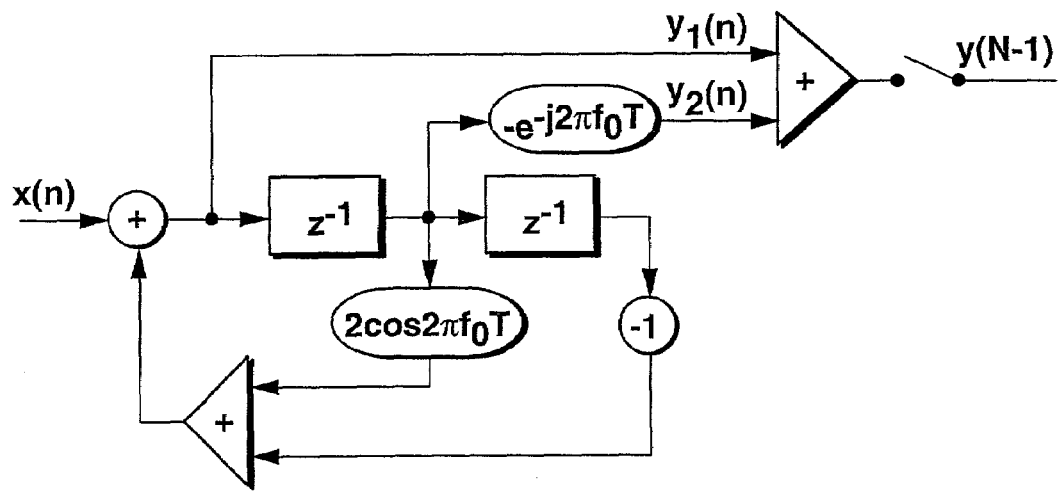
FIG. 6 is the view of a functional diagram of the computation according to the Goertzel algorithm for a frequency $f_0$.

FIG. 6 shows a functional diagram of the mathematical relations; the actual computation can be made in a further way and is intended in the example to be carried out by a digital computer which is constructed using DSPs for fast addition and multiplication operations. In FIG. 6 the ovals containing values represent a multiplication by the respective value, the elements $z^{-1}$ are delay elements (delay by 1 sample period), the triangles are adders and the circle containing a plus sign is an adder.

As can be seen from FIG. 6 an input value x(n) arrives at the start of the computation process at a first delay element and from there proceeds to a second delay element and is added from the output thereof after multiplication by −1 to a further value, which results from the output signal of the analogue adder delayed by a single delay time multiplied by the factor 2 cos $2\pi f_0 T$. This result is subsequently added in the adder to the input signal and is therefore input value for the delay chain again. This part of FIG. 6 just described is an IIR filter (infinite impulse response filter). Therefore the input values x(0), . . . , x(N−1) are processed one after the other, which requires approximately N real multiplications. By using the filter states the desired output value y(N−1) is computed only in the last step by using two real multiplications. This is symbolised by the sampler (top right). The value obtained y(N−1) is then a complex value (therefore consists of two values). The last mentioned multiplications use the exponential factor $e^{-j2\pi f_0 T}$ known from the formula of the Fourier transform. The multiplication by this factor is made only once per block in order to save computation time.

An improvement is achieved with regard to the frequency selectivity or resolution when the input signal is multiplied by a window function w(n), which produces x(n)·w(n). Instead of a rectangular function, the window function can be a function (for example Hamming window) which forces a drop in amplitude in the direction of the lateral edges for example.

In the example a block allocation into blocks of length N as shown in FIG. 3 is used. The illustrated blocks v−1, v, v+1 etc., are processed while the blocks of this one message channel located therebetween are skipped. In the embodiment of the method shown here, the hardware provided for carrying out the method has time, for example, to process blocks in a further message channel in the time intervals which correspond to the gaps between the blocks of FIG. 3 in each case.

During block processing the short-time rating is measured in order to standardise the values obtained in order to be independent of the respective specific level. A computation in accordance with the Goertzel algorithm is carried out in each block v which computation is adjusted to the frequency $f_0$ sought in order to derive the complex value $y_v(N-1)$. The window function w(n) which is used can be dimensioned such that it fulfils the desired frequency characteristics (for example as required in G. 164, G. 165).

Figure 7:
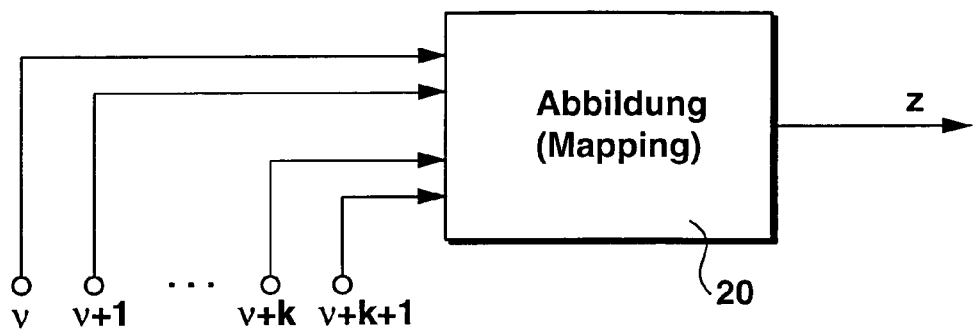
FIG. 7 is a schematic view of the formation of a result value by means of mapping.

Finally, it is particularly important that the output signals y(N−1) (see FIG. 5) which result from processing of the examined blocks in FIG. 3, are combined as is shown in FIG. 7. In other words, the values are subjected to mapping 20 to give a decision value z which simply provides the desired end result.

By using these structures shown and by virtue of the fact that by mapping 20 the sum of the complex values $y_{v-1}(N-1)+y_v(N-1)=z$ is formed as decision variable in this example, the method can be used to increase the frequency selectivity.

In a further embodiment the implemented combination is produced as follows: It is checked whether the standardised variable $y_v(N-1)/\sqrt{P_v}$ is at least three times greater than a specific threshold value in order to decide whether a sinusoidal signal is present.

If the average number of operations of the detector is examined, the sum of the combination of filter output signals is only small. If only every m-th block is processed in order to compute the filter output signals according to Goertzel, the number of computations which are used for combining the filter output signals, is divided by m·N to obtain the average value. Owing to this "sub-sampling", i.e. owing to non-processing of certain blocks, they contribute to only a small extent to the average complexity.

In the following a solution to the problem of detecting the phase reversal by using the structure shown above is described. If $$X(n)=A\cdot\cos(2\pi fTn+\theta)$$

and it is additionally assumed that the spectrum of the window function $W(e^{j2\pi fT})$ for f=2$f_0$ has faded sufficiently, then $$y(N-1) \approx \frac{A}{2} e^{j2\pi f_0 T(N-1)} e^{j\theta} \cdot W\left(e^{j2\pi(f_0-\tilde{f})T}\right)$$

results. This is a complex value which has a large sum for $\tilde{f}=f_0$ and becomes smaller if the instantaneous frequency $\tilde{f}$ deviates from $f_0$. The factor $e^{j2\pi f_0 T(N-1)}$ is known in advance. It is now provided according to the invention that the complex value y(N−1) is used to carry out a phase measurement of the cosine function, in other words to derive θ.

Because there is a time displacement from one measured block to a further measured block, the time displacement converts to a phase rotation factor $e^{j2\pi \tilde{f} T \cdot N}$, if one proceeds from one block directly to the next and there is no noise. This phase factor could be compensated if the frequency of the transmitted tone $\tilde{f}$ were to satisfy the equation $\tilde{f}=f_0$ exactly. As there is a frequency tolerance however (of 1% for example) there is an unknown phase increase or phase drop from one measuring instant to the next measuring instant. By using a plurality of measurements the linear phase increase can be computed and compensated during measurement. Subsequently, the phase measurement can be used to determine a phase step very reliably.

Figure 8:
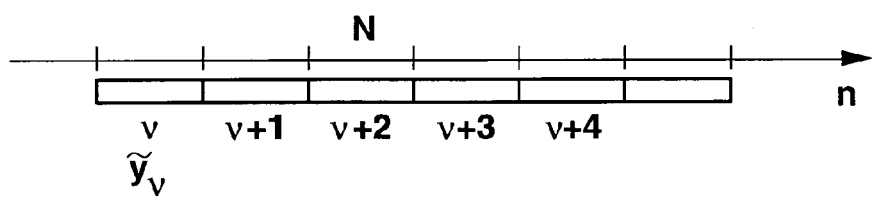
FIG. 8 is the view of the position of blocks with a block length N=80 of a single channel evaluated by the method in accordance with a further embodiment.

In an embodiment the following method is provided as a special solution. The three (optionally standardised) output signals of blocks v, v+2 and v+4, as illustrated in FIG. 8, which in the example have a mutual distance from a block in each case, are combined in a product. (In contrast to FIG. 3, the blocks are numbered differently). Therefore $$\tilde{y}_v(N-1)\tilde{y}^*_{v+2}(N-1)\tilde{y}^*_{v+2}(N-1)\tilde{y}_{v+4}(N-1)=z$$

gives the decision variable z, wherein y* denotes the conjugated complex variable. As this combination only uses multiplications, it can be advantageously implemented by a DSP. In fact, only three complex multiplications are used which corresponds to 12 real multiplications. As can be seen by using a complex phase factor in the equation, the decision value is independent of the original phase and independent of linear phase change. If there is no phase shift or phase step, and there is no noise the result z would be purely real. If the phase has changed by φ in block v+4 at the latest, the decision variable z is proportional to $e^{j\phi}$ and therefore this indicates the phase change as desired. This formula carries out the method described in claim 8 in a simple manner.

If a phase change is not produced at the edge but inside a block, v+4 in the example, the sum of the amplitude | $\tilde{y}_{v+4}(N-1)$| is not as high as normal, in addition the phase of z is somewhere between 0 and φ. This is not sufficient to bring a phase value above a threshold value. At the next instant, when the next decision must be made, the block would be measured with the phase change as $\tilde{y}_{v+3}(N-1)$ and is therefore not used when determining z. With $\tilde{y}_{v+4}(N-1)$ however, the phase change is clearly reflected and z indicates that a phase change, for example a phase reversal, has taken place.

It emerges from the information theory that a sufficient number of samples disturbed by noise must be processed before a reliable decision is reached. Therefore practically no other solution is currently conceivable which requires so little memory space and computational complexity.

In a specific embodiment m=1 and the block length is only N=40. A function specifically devised for G. 165 with the length 40 is used as window function. The signal-to-noise ratio (SNR) was only 5 dB which is the minimum value for G. 165. A simulation with 1 million tests demonstrated the following: incorrect allocations of "no tone" or "simple tone" to a further result were not determined; a simple tone with phase reversal was not detected at a frequency of only $4\times10^{-5}$ times. The method is therefore very reliable.

The method in accordance with the invention can be used at any frequency. As a generalisation, the frequency can be self-adapting. In addition to the adaptive processing already discussed a test for numerous frequencies can be made block by block by using a short block length and a threshold value which is not very high. If probability for the existence of a frequency to be tested exists, the method can test this frequency further until there is certainty in the sense of a sequential decision. Otherwise, the method continues to sample all frequencies. As a result, complexity can also be replaced by decision time in this method as well.

In embodiments of the invention the method is self-adapting as a function of the signal-to-noise ratio. If the sinusoidal signal is transmitted and the variable |$y_v(N-1)$| demonstrates a high variance from one measured block to the next measured block, the window length is increased. As an alternative, more values are used in a compensation computation. In this way, the algorithm is caused to operate at a constant error rate with different signal-to-noise ratios, which is an important advantage compared with other algorithms.

Figure 9:
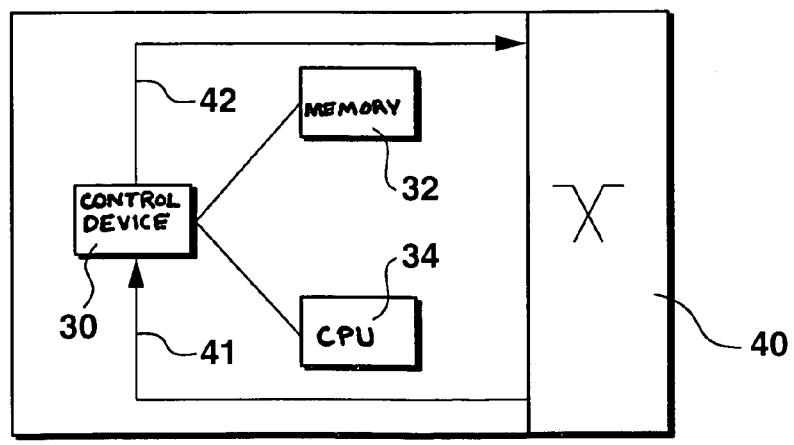
FIG. 9 is a schematic block view of a device for carrying out the method according to the invention.

The arrangement shown in FIG. 9 has a control device 30, a memory device 32 and a central processor 34 which can carry out the Goertzel algorithm. The values of the frequencies or parameters to be detected at least are stored in the memory device 32 and the control device 30 causes these values to be supplied consecutively to the central processor 34, for example as variable $f_0$, in order to carry out the method according to the invention. The arrangement is provided in a switching centre 40 in order to identify dialling tone signals, echo compensation sample signals and, if required, other sinusoidal tone signals. The signals to be analysed are supplied to the control device 30 via a line 41 from the switching centre 40. The control device 30 induces detection by the central processor 34 and the results are supplied via a line 42 to the switching centre 40.

The feature of mapping is regarded as an independent invention in so far as it does not matter whether the blocks are ignored or not during detection.

What is claimed is:

1. A method for detecting an information signal, a tone of a specified frequency, or a phase change of the tone in a signal which contains the information signal or the tone, the method comprising:
    dividing the signal into a plurality of blocks corresponding to time segments of the signal, wherein the blocks have an adjustable length which is set to ensure accurate detection of the information signal, the tone or the phase change;
    selecting a predetermined number of the blocks to be processed for detection, wherein the blocks which are not selected are not further processed;
    transforming sample values of the selected predetermined number of the blocks from the time domain to the frequency domain, to produce at least one output value; and
    detecting the information signal, the tone or the phase change based on said at least one output value.

2. The method in particular according to claim 1, wherein said detecting comprises mapping a plurality of output values for the selected predetermined number of the blocks, and generating a decision value based on a result of said mapping.

3. The method according to claim 2, wherein the mapping comprises a summation of the output values.

4. The method according to claim 2, wherein the mapping comprises a product of the output values.

5. The method according to claim 1, wherein the transforming is frequency-selective and is adjusted to the frequency of the tone currently to be detected.

6. The method according to claim 1, wherein the transforming comprises applying a Fourier transform to the sample values of the selected predetermined number of the blocks.

7. The method according to claim 1, wherein the transforming comprises multiplying the sample values of the selected predetermined number of the blocks by a window function and then applying a Fourier transform to the sample values of the selected predetermined number of the blocks multiplied by the window function.

8. The method according to claim 6, wherein the Fourier transform is computed by using a Goertzel algorithm which is adjusted to the specified frequency of the tone to be detected.

9. The method according to claim 1, wherein said detecting step comprises detecting a phase at a first moment and a second moment occurring a predetermined time after the first moment from complex output values of the transforming step, determining a first phase difference between the phase at the first moment and the phase at the second moment, determining a second phase difference between the phase of the second moment and the phase at a third moment occurring the predetermined time after the second moment, and determining whether a phase change exists based on a result of a comparison of the first and second phase differences.

10. The method according to claim 9, wherein the transforming is performed using complex multiplication.

11. The method according to claim 9, characterised by the implementation of an evaluation of the formula $$\tilde{y}_v(N-1)\tilde{y}^*_{v+2}(N-1)\tilde{y}^*_{v+2}(N-1)\tilde{y}_{v+4}(N-1)=z$$

where z is a decision variable, $\tilde{y}_v$ and $\tilde{y}_{v+4}$ denote output signals of selected predetermined blocks v and v+4, respectively, $\tilde{y}^*_{v+2}$ denotes a conjugated complex output signal of selected predetermined block v+2 and N denotes a block length of the selected predetermined blocks v, v+2 and v+4.

12. The method according to claim 1, wherein the adjustable length of the selected predetermined number of blocks used for detection is adjusted as a function of the signal/noise ratio (SNR) of the signal so that a substantially constant error rate of detection is achieved over a range of signal/noise ratios.

13. A device for detecting an information signal, a tone, or a phase change of the tone in at least one signal which contains the information signal or the tone, the device comprising:
an analog-to-digital converter for converting the signal into a plurality of sample values; and
a detector for dividing sample values of the signal into a plurality of blocks corresponding to time segments of the signal, wherein the blocks have an adjustable length which is set to ensure accurate detection of the information signal, the tone or the phase change, selecting a predetermined number of the blocks to be processed for detection, transforming the sample values of the selected predetermined number of the blocks from the time domain to the frequency domain to produce at least one output value, and detecting the information signal, the tone or the phase change based on said at least one output value, wherein the blocks which are not selected are not processed.

14. The device according to claim 13, further comprising a memory device and a control device which during operation supplies data contained in the memory device concerning tones to be detected to the detector which generates an output signal indicating whether the information signal, the tone, or the phase change of the tone has been detected.

* * * * *